United States Patent [19]
Mendrin et al.

[11] 3,970,389
[45] July 20, 1976

[54] VARIABLE FREQUENCY INTERFEROMETER

[76] Inventors: Michael J. Mendrin, 425 Date St., Montebello, Calif. 90640; Richard H. Taylor, 720 Mobile Ave., Los Angeles, Calif. 90022

[22] Filed: Feb. 14, 1974

[21] Appl. No.: 442,463

[52] U.S. Cl. .............................. 356/106 R
[51] Int. Cl.² ............................ G01B 9/02
[58] Field of Search ................ 356/106, 107

[56] References Cited
UNITED STATES PATENTS

| 2,604,004 | 7/1952 | Root | 356/106 R |
| 3,472,598 | 10/1969 | Hossmann | 356/107 |
| 3,734,623 | 5/1973 | Walber | 356/110 |

Primary Examiner—John K. Corbin
Assistant Examiner—Conrad Clark

[57] ABSTRACT

Distance measurement by conventional optical interferometry requires physical movement of an optical element. The present system obtains interference with a continuous range of radiation wavelengths, providing a direct measurement of a constant optical path difference, in terms of the fringe count and the end wavelengths of the range employed. Variations in the optical path difference occurring during the measurement are compensated by simultaneous interferometry with a fixed wavelength.

18 Claims, 8 Drawing Figures

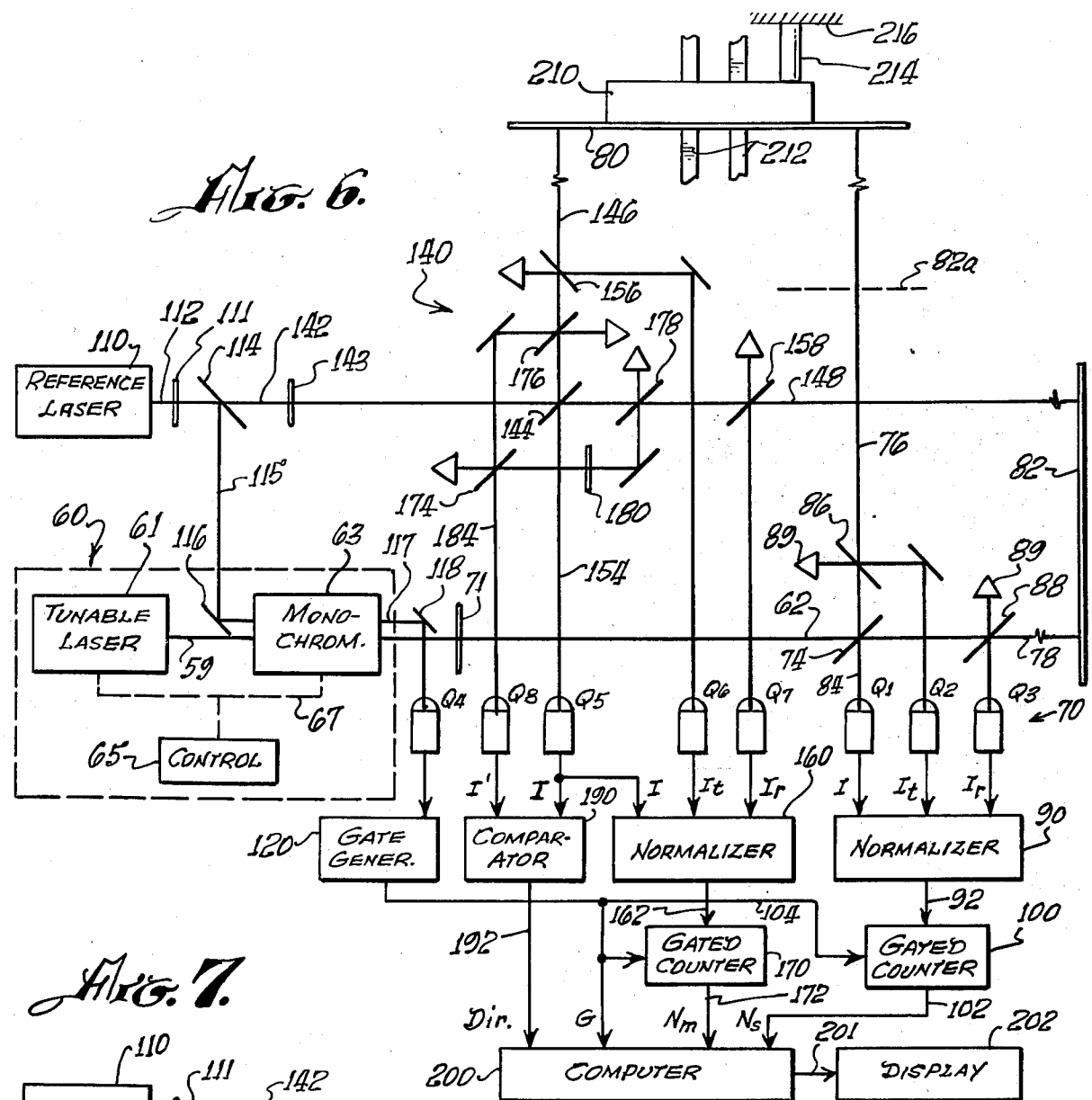
Fig. 6.
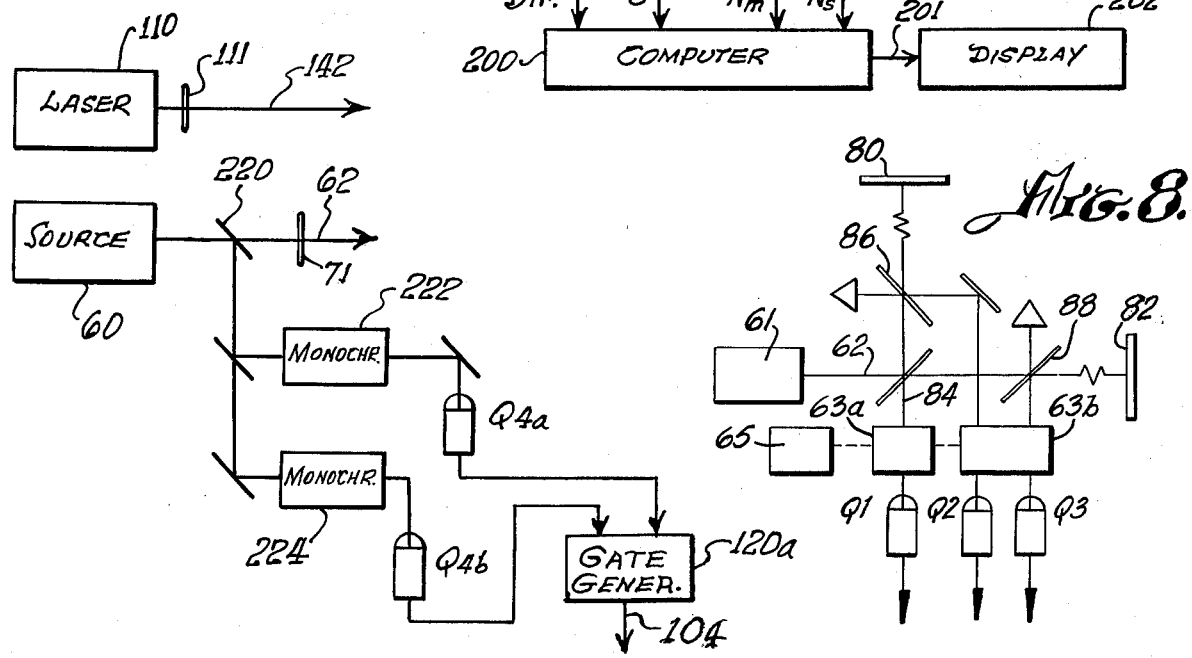
Fig. 7.
Fig. 8.

VARIABLE FREQUENCY INTERFEROMETER

THE FIELD OF THE INVENTION

This invention has to do generally with the optical measurement of distances by interferometry.

The invention relates more particularly to improved apparatus and methods by which the general principles of interferometry can be utilized to provide an accurate distance measurement more directly than has previously been possible.

The conventional interferometer divides a beam of monochromatic and essentially coherent radiation into two portions which follow separate paths and are then reunited to produce interference. The number of interference fringes produced as one path is varied in optical length relative to the other provides a measure of the change in path length. However, conventional interferometry is incapable of measuring the difference between the two path lengths while they are held constant. It is therefore impossible to measure many types of distances which by their very nature prevent the continuous and precise movement of an optical element over the distance to be measured.

A primary object of the present invention is to permit the direct and accurate determination of the difference in optical length between the two radiation paths in an interferometer.

A further object of the invention is to permit interferometric measurement of the distance between two points without requiring the movement of an optical element between those points.

Whereas conventional interferometry makes use of variations in the interference pattern while the difference in optical path length is altered, the present invention makes use of variations in the interference pattern while the wavelength of the radiation is altered.

In accordance with one aspect of the invention, the wavelength of the interfering radiation is varied continuously between two end values, and the difference in optical path length is determined in terms of the observed number of interference fringes and the two end wavelengths.

In accordance with a further aspect of the invention, means are provided for compensating changes that may occur in the distance that is being measured during the measuring process. Such compensation may be designed, for example, to provide a corrected measure of the optical path difference either at the start or at the end of the measuring process, or both values may be made available, if required.

BRIEF DESCRIPTION OF THE DRAWING

A full understanding of the invention, and of its further objects and advantages with relation to the prior art, will be had from the following description of certain illustrative embodiments, with reference to the accompanying drawings in which

FIG. 6 is a schematic diagram representing an illustrative interferometric system embodying the invention;

FIG. 7 is a fragmentary schematic diagram representing a modification; and

FIG. 8 is a fragmentary schematic diagram representing a further modification

THE PRIOR ART

Figure 1:
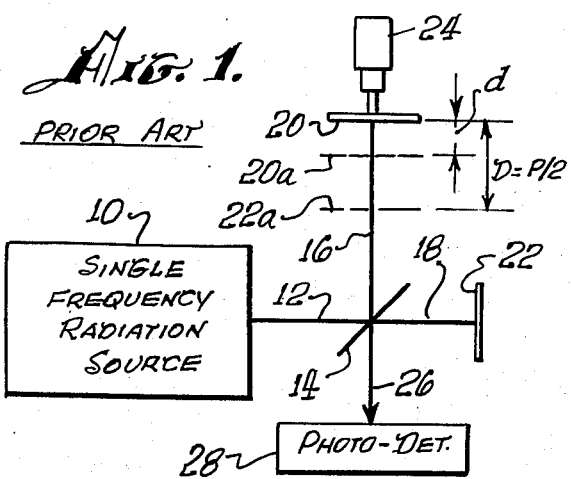
FIG. 1 is a schematic diagram representing a conventional interferometer.

The principle of operation of the classical Michelson interferometer will first be described for convenience of reference, and is illustrated schematically in FIG. 1. The source 10 emits a beam 12 of substantially coherent radiation consisting ideally of a single frequency f in the optical region of the electromagnetic spectrum. That initial beam is split by the partially reflecting mirror 14 into the two beams 16 and 18. Beam 16 goes to the target mirror 20 and is reflected back to mirror 14, while beam 18 goes to the reference mirror 22 and is reflected back to mirror 14. The respective returned beams are partially transmitted and partially reflected by mirror 14, producing at 26 a mixed beam of radiation partly from target mirror 20 and partly from reference mirror 22. The intensity of that mixed beam is sensed by the photodetector 28.

Considering the superposition principle of optics, the effective intensity of mixed beam 26 depends upon the phase difference $\phi$ between the two radiation components. Each beam, being essentially monochromatic and coherent, has at any instant a well defined phase that varies periodically along the path of the beam with a spatial period equal to the wavelength $\lambda$ of the radiation in the particular medium it is traversing. Since the two component beams were in phase with each other as they first arrived at mirror 14, their phase difference $\phi$ when recombined in beam 30 is a periodic function of the difference between the lengths of the separate paths they have traversed, again with period equal to $\lambda$. Hence, if the path difference is progressively increased or decreased, the intensity sensed by photodetector 28 will vary periodically, completing a cycle of variation each time the path difference changes by $\lambda$.

In the conventional interferometer of FIG. 1, reference mirror 22 is typically fixed, while target mirror 20 is mounted for accurately controllable movement parallel to its component beam 16, as by the micrometer 24. The virtual image of reference mirror 22, reflected in mirror 14, is represented by the dashed line 22a. The distance D from that image 22a to target mirror 20 is the effective or optical mirror separation, but may be referred to generally as simply the mirror separation. In constructing optical image 22a the physical thickness and index of refraction of mirror 14 must ordinarily be taken into account. However, for clarity of illustration mirror 14 is shown with zero thickness, and the plane parallel plate that normally compensates the mirror thickness is omitted from FIG. 1 and from other drawings.

Both component beams 16 and 18 effectively traverse twice the distance from mirror 14 to image 22a, whereas target beam 16 traverses in addition twice the mirror separation D from image 22a to mirror 20. The path difference P between the two beams therefore equals 2D, as indicated in the drawing. Thus, if target mirror 20 is moved progressively, as by rotation of micrometer 24, the intensity sensed by photodetector 28 varies periodically, completing a cycle of variation each time the mirror is moved through a distance $\lambda/2$.

For example, mirror movement through a distance $d$ to the position indicated at 20a alters the path difference P by $2d$ and produces a number $n$ of intensity cycles or "fringes" such that $$d = n\lambda/2. \tag{1}$$

If the wavelength $\lambda$ is known, the fringe count $n$ thus provides a measure of $d$, which is the distance the target mirror has moved and represents the change in the mirror separation D. Thus, the Michelson interferometer can perform many useful measuring functions. However, it has the disadvantage that no information can be obtained as to the mirror separation D or the path difference P while both mirrors are held in fixed positions.

DESCRIPTION OF THE INVENTION

Principles of Operation

Figure 2:
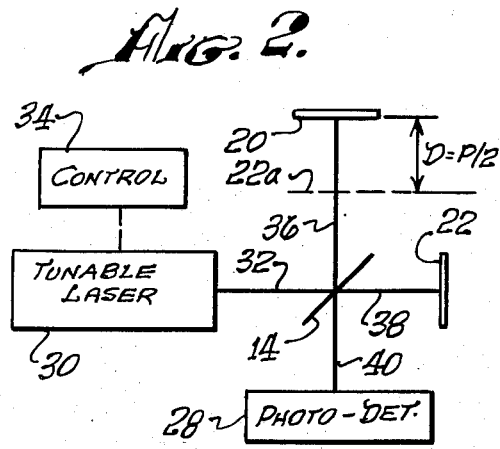
FIG. 2 is a schematic diagram representing in simplified form an interferometer embodying the invention.

In accordance with one aspect of the present invention, cyclic variations in the output intensity from an interferometer are produced by varying the wavelength of the sensed radiation, rather than by varying the optical difference between the two path lengths. We have discovered that by counting the fringes produced in that way, and by determining the radiation frequency at the start and at the end of the counting operation, one can obtain a direct measure of the existing path difference. FIG. 2 illustrates schematically the principles and typical operation of that aspect of the invention.

In FIG. 2 the partially reflecting mirror 14, the target mirror 20, the reference mirror 22 and the photodetector 28 perform functions generally equivalent to those already described for the similarly numbered elements of FIG. 1. Moreover, the image of mirror 22 is again shown at 22a as in FIG. 1, and the mirror separation D from image 22a to mirror 20 equals half of the path difference P between the two component beams 36 and 38 reflected from the mirrors 20 and 22. Target mirror 20 is adjustable to make D represent the distance to be measured.

However, the radiation supplied as input to the interferometer of FIG. 2 differs radially in nature and result from that in FIG. 1. As indicated schematically in the drawing, that radiation is derived from the radiation source 30 which typically includes tunable single frequency laser apparatus for producing at 32 a beam of substantially monochromatic coherent radiation having a frequency that is continuously variable over a predetermined range. That frequency variation is controlled manually or automatically by the control mechanism indicated schematically at 34.

The frequency and wavelength of radiation in a given medium are connected by the simple relation $\lambda = v/f$, where $v$ represents the radiation velocity in that medium and is equal to the velocity $c$ in vacuum divided by the index of refraction for the particular medium and wavelength. When the medium is air at atmospheric pressure, as is normally the case for an interferometer, at least for the variable part of the radiation path, the index of refraction can be taken as unity. The radiation velocity is then $c$, and $$\lambda = c/f \tag{2}$$

By means of that relation, or its more complete equivalent if media other than air must be considered, any functional relationship involving either frequency or wavelength can be expressed alternatively in terms of the other. It is usually convenient to refer to frequency when discussing the spectral characteristics of radiation emitted from source 30, but to describe the actual interference phenomena in terms of wavelength.

The intensity I of the combined beam 40 in FIG. 2, as measured by photodetector 28, depends upon the phase difference $\phi$ between the two radiation components, as in a conventional interferometer. If the intensities of the target and reference components of the mixed beam are denoted by $I_t$ and $I_r$, respectively, that dependence can be expressed by the equation $$I = I_t + I_r + 2(I_t I_r)^{1/2} \cos \phi. \tag{3}$$

We shall assume for definiteness that mirror 14 splits an incident beam evenly between reflected and transmitted components, and that all losses can be neglected. The separate intensities of the two component beams are then equal, and each is ¼ of the intensity $I_o$ of initial beam 32. With those simplifying assumptions, equation (3) becomes $$I = I_o(1 + \cos \phi)/2. \tag{3A}$$

The dependence of phase difference $\phi$ upon the path difference P and the wavelength $\lambda$, assuming that the phase changes at the various reflections cancel out, can be expressed as $$\phi = 2\pi P/\lambda. \tag{4}$$

Substitution of (4) in (3A) gives $$I = I_o(1 + \cos 2\pi P/\lambda)/2 \tag{5}$$

Thus, as control 34 causes the wavelength to vary continuously with time, the photodetector senses a cyclic rise and fall of intensity, with each maximum typically occurring when the wavelength $\lambda$ is evenly divisible into the path difference P, that is, when $$P = m\lambda \tag{6}$$

where $m$ represents an integer. Each successive intensity maximum corresponds to the next higher or next lower integral value of $m$, depending upon the direction of wavelength variation.

Let us suppose that the wavelength is caused to decrease steadily from an initial value $\lambda_a$, at which the intensity I has a peak value with $m$ equal to $m_a$, to a final value $\lambda_b$l, at which the intensity again has a peak value with $m$ equal to $m_b$. The number $n$ of intensity peaks counted during that entire wavelength variation is $$n = m_b - m_a. \tag{7}$$

Since P is assumed constant, we have from (6) and (7), $$P = m_a \lambda_a = m_b \lambda_b = (m_a + n)\lambda_b, \tag{8}$$

from which $$m_a = \frac{n\lambda_b}{\lambda_a - \lambda_b} \tag{9}$$

and $$P = \frac{n\lambda_a \lambda_b}{\lambda_a - \lambda_b} \tag{10}$$

Equation (10) provides a direct measure of the actual value of the interferometer path difference P. And since that path difference is just twice the distance D between image 22a and target mirror 20, the equation provides also a measure of D.

The right hand side of equation (10) may be considered as the number n of intensity cycles counted during a progressive change of radiation frequency multiplied by a constant $$K = \lambda_a \lambda_b/(\lambda_a - \lambda_b) \qquad (10A)$$

which depends only upon the selected initial and final wavelengths. Thus, K is completely independent of the path difference being measured and of the rate of change of the wavelength; indeed, that wavelength variation may even be intermittent. The same result is obtained so long as the entire range of wavelength variation is covered monotonically, that is, without any reversal of direction.

The preceding analysis assumed for the sake of clarity that the initial and final wavelengths $\lambda_a$ and $\lambda_b$ coincided with intensity peaks. On the other hand, if the frequency variation begins and ends at wavelengths $\lambda_1$ and $\lambda_2$ which are accurately known but which are not themselves intensity peaks, the number of peaks counted during the frequency variation between $\lambda_1$ and $\lambda_2$ is always within one count of the number of peaks that would be counted if the frequency had been varied between the two peak wavelengths nearest to those respective actual wavelengths. Accordingly, we may use the latter n interchangeably to represent the count under either condition, subject to a maximum fractional error of $1/n$.

Thus, if n represents the number of fringes counted during a frequency variation between any two wavelengths $\lambda_1$ and $\lambda_2$, the distance between image 22a and target mirror 20 is $$D = \frac{P}{2} = \frac{n \lambda_1 \lambda_2}{2(\lambda_1 - \lambda_2)} \qquad (11)$$

The equivalent expression in terms of frequencies rather than wavelengths, obtained by use of equation (2), is $$D = \frac{nc}{2(f_2 - f_1)} \qquad (11A)$$

COMPENSATION FOR TARGET MOVEMENT

The described distance measuring procedure has the novel capability of providing a direct evaluation of the path difference in an interferometer while that path difference is held constant. However, the progressive difference variation and the accompanying fringe count require a finite time period, even when carried out automatically. Under some conditions the distance to be measured may vary during that time. A further aspect of the invention provides means for compensating the effect of such movement, so that the result of a measurement can be interpreted without ambiguity.

The problem presented by random movement of the target mirror is best understood by reference to a graphical representation, which will be referred to as a phase diagram. As illustrated schematically in FIG. 3, the phase diagram has two dimensions, with the radiation frequency plotted horizontally as abscissa and the optical path difference plotted vertically as ordinate. Each vertical line on the diagram then represents a definite frequency. For any such fixed frequency the observed output intensity of the interferometer will exhibit peaks at particular values of the path difference P such that $P = n \lambda = nc/f$. If such peak points are plotted on the diagram for a range of frequency values, they form a family of curves, each curve corresponding to a distinct value of the integer n and representing a locus of points for which the output intensity for an interferometer has a peak value. When plotted with frequency as abscissa, as in FIG. 3, the peak curves are of hyperbolic form. The corresponding curves when plotted with wavelength as abscissa appear as straight lines passing through the origin of coordinates.

Figure 3:
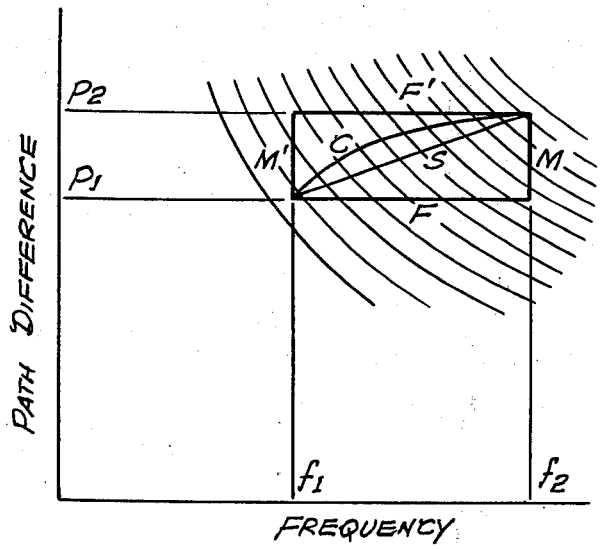
FIG. 3 is a schematic graph representing the dependence of phase on path difference and frequency, and illustrating an aspect of the invention.

Any segment of a vertical line in FIG. 3 may be considered as a representation of the operation of a conventional Michelson interferometer, in which the path difference P is varied and the intensity peaks are observed in radiation of a fixed frequency. It will be noted from the diagram that the vertical interval between adjacent peak curves is constant for each wavelength, but decreases with decreasing wavelength and hence with increasing frequency.

Now let us consider the aspect of the present invention described above, wherein the path difference P remains fixed and the frequency is varied monotonically from one definite value to another. Such action may be represented in FIG. 3 by a horizontal line segment. For example, the line segment F represents frequency variation between $f_1$ and $f_2$ while holding the target mirror stationary at a path difference of $P_1$. The number of intensity peaks counted at the photodetector during that operation is given by the number $N_f$ of peak curves which are crossed by the line segment F. As can be seen from the figure, the peak curves between a given pair of frequencies vary in slope in such a way that the number of curves crossed by a horizontal line such as F increases progressively with the value of P, confirming that the peak count $N_f$ provides a direct measure of the absolute value of the path difference P.

Now, suppose that the frequency is increased from $f_1$ to $f_2$ during the finite time interval from $t_1$ to $t_2$, and that during that time the interferometer path difference P changes from an initial value $P_1$ to a larger final value $P_2$. If the path difference is known for each value of the frequency, for example if P is a known function $h(f)$, the curve C corresponding to $P = h(f)$ can be drawn between the points $(f_1, P_1)$ and $(f_2, P_2)$ and will represent the described operation. In particular, the number of intensity peaks observed during that operation equals the number $N_c$ of peak curves crossed by the operation curve C.

However, as can be seen from the diagram, so long as operation curve C does not cross any peak curve more than once, the number $N_c$ of peak curves crossed is determined uniquely by the end points of curve C and is independent of the detailed shape of that curve. Hence the actual operation curve C can ordinarily be replaced for all practical purposes by the straight line S between the same end points. In particular, curve S has a number $N_s$ of peak crossings equal to $N_c$.

Now consider the triangle bounded by the three lines designated S, F and M in FIG. 3, where M is the vertical line segment at frequency $f_2$ between $P_1$ and $P_2$. The continuity of the field of peak lines is such that any line that crosses one side of that triangle also crosses just one other side. Moreover, all lines crossing side S also cross one or other of the sides F and M. Hence $N_s = N_f + N_m$, where $N_m$ represents the number of peak crossings of line M.

In accordance with the present invention, the value of $N_m$ can be determined by providing, in addition to the variable frequency interferometer operating between the frequencies $f_1$ and $f_2$, an interferometer of conventional Michelson type operating at the frequency $f_2$. If the output intensity of such a Michelson interferometer is observed during the described operation of the variable frequency interferometer, the number of intensity peaks observed is just $N_m$. Accordingly, the number $N_f$ of counts that would have been obtained if the path difference had remained at its initial value $P_1$ can be determined despite an arbitrary increase in that difference during the frequency variation. It is only necessary to subtract from the actual count $N_s$ the number of counts $N_m$ obtained on a conventional Michelson interferometer operating during the same time period at the final frequency $f_2$. The resulting value $$N_f = N_s - N_m \qquad (12)$$

gives a direct measure of the absolute path difference that existed at the beginning of the frequency sweep.

If a measure is desired of the path difference $P_2$ at the end of the frequency sweep, rather than that at the beginning, the Michelson interferometer may be operated at the beginning frequency $f_1$. Considering the triangle formed in FIG. 3 by the lines S, M' and F', it is clear that the peak count observed on the operation line S is equal to the sum of the crossings on line M', which may be obtained from the observed peak count on a Michelson interferometer at frequency $f_1$, and the crossings on line F', which is the peak count that would have been obtained if the path difference had been held at its final value $P_2$ throughout the frequency sweep. Dropping the primes, equation (12) applies as before. Thus, the path difference either at the start or at the end of the measuring operation can be determined simply by operating the Michelson interferometer at the final or the initial frequency, respectively, and utilizing equation (12).

This result was obtained on the assumption that the variable frequency interferometer was operated with increasing frequency, and that the path difference $P$ increased during that operation. It will be seen at once from FIG. 3 that the same result applies also if the frequency is varied in the opposite direction from $f_2$ to $f_1$ and the value of $P$ also shifts from a higher to a lower value. Thus equation (12) is applicable as described whenever the variation of path difference is in the same sense as that of frequency.

If, on the other hand, the path difference varies in the opposite sense to the frequency variation in the variable frequency interferometer, equation (12) is replaced by $$N_f = N_s + N_m. \qquad (12A)$$

Figure 4:
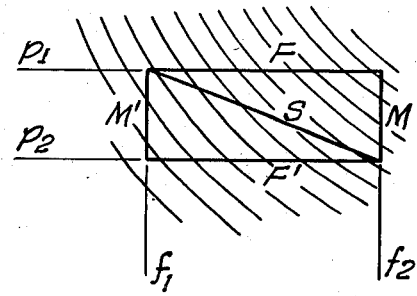
FIGS. 4 and 5 are further graphs similar to FIG. 3.

For example, referring to FIG. 4, when the variable frequency interferometer is operated with increasing frequency from $f_1$ to $f_2$, as before, but the change of path difference $P$ from $P_1$ to $P_2$ involves a decrease, the actual peak count, given by the number $N_s$ of crossings of the line S in FIG. 4, is less than the count that would be obtained on the line F by just the number of crossings on the line M. That is, $N_s = N_f - N_m$. Also, $N_s$ is similarly less than the count that would be obtained on the line F' by just the number of crossings on the line M'.

Thus, for either direction of change of path difference $p$, that change is compensated by observing the peak count for a Michelson interferometer operating at the opposite end of the frequency range from that at which the value of $P$ is desired, and using equation (12) when the path difference varies in the same sense as the frequency, equation (12A) when in the opposite sense.

Figure 5:
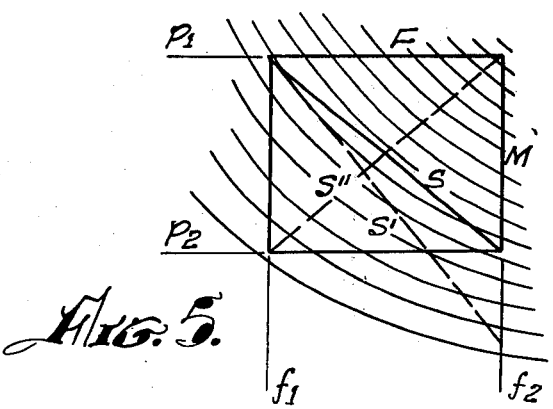

It should be noticed that, when the path difference and frequency vary in opposite senses, there is at least a theoretical possibility for the path difference to vary so rapidly during operation of the variable frequency interferometer that the above conclusions no longer apply. For example, FIG. 5 represents a modification of FIG. 4 in which the slope of curve S is increased to the point that it crosses one of the peak curves twice, generally leading to an ambiguous result. Under that condition, neither equation (12) nor (12A) applies. For even greater slopes, such as that of curve S', the procedure described above may be applied, but with use of the relation $$N_f = N_m - N_s \qquad (12B)$$

If it is known in advance in which sense the path difference will vary during operation of the variable frequency interferometer, ambiguities of the described type can be avoided by sweeping the frequency in the same sense. Suppose, for example, that the path difference is expected to decrease rapidly during a measurement, which might lead to an ambiguous operation line such as S in FIG. 5. If the variable frequency interferometer is operated from $f_2$ to $f_1$ the operation line takes the alternative position S'', which produces an unambiguous result.

If the direction of change of the path difference is not known in advance, it may be desirable to operate simultaneously two varied frequency interferometers in which the radiation frequency is swept in opposite directions between the same two end frequencies, as well as two Michelson interferometers which simultaneously monitor the path difference at the respective end frequencies. It is then always possible to select the appropriate pair of peak counts to produce an unambiguous determination of either the inital or final path difference, as may be desired. Although the described ambiguity is theoretically possible, it can occur in practice only at abnormally high rates of change of the path difference, and can ordinarily be avoided simply by reducing the time required to complete the peak count. For example, presently available tunable dye lasers and coupled etalon monochromators can be swept through a useful frequency range in as little as 1/100 second.

Discussion of FIGS. 3, 4 and 5 has assumed for clarity that the variable frequency interferometer and the Michelson interferometer have equal path differences. However, in actual practice it is sufficient if both path differences change by the same amount during the counting period so that the differential relationship between them is maintained constant. As already pointed out, the Michelson interferometer count depends only upon the change in path difference. Hence, its count is the same whether the path difference shifts between $P_1$ and $P_2$, or between two other values $P_1'$ and $P_2'$ so long as $P_2' - P_1' = P_2 - P_1$. That relation is automatically satisfied if the target mirrors of the two interferometers are rigidly coupled together.

PREFERRED EMBODIMENT

An illustrative variable frequency interferometer system in accordance with the invention is represented schematically in FIG. 6. The primary radiation source 60 comprises the tunable dye laser 61 coupled in tandem with the monochromator 63 which is driven in approximate synchronism with the laser by the control mechanism 65 acting through the coupling 67. Laser 61 produces the output beam 59, typically comprising a fairly narrow but continuous band of frequencies which is shiftable continuously through an appreciable frequency range, for example several hundred to several thousand angstroms, in response to tuning of the laser. Monochromator 63 is preferably a Fabry-Perot etalon which may have multiple stages to progressively select from the emission band of the laser an effectively monochromatic frequency which varies continuously as the etalon is driven in approximate correspondence to the tuning of the laser. The resulting output beam 62 is substantially coherent, comprising wave trains of sufficient length to produce effective interference patterns over the required optical path lengths. The optical bandpass filter 71 at least partially equalizes the intensity of beam 62 throughout the range of emitted frequencies by selectively absorbing the more intense frequencies.

Beam 62 is delivered to the variable frequency or primary interferometer 70, where it is split by the partially reflecting mirror 74 into the target beam 76 and the reference beam 78. Those beams are returned to mirror 74 by the respective target and reference mirrors 80 and 82, producing interference in the combination beam 84, which is sensed by the photodetector Q1. Like the other photo-detectors to be described, Q1 typically comprises a photo-multiplier with suitable supplementary circuitry of conventional type.

The analogue signal from Q1 is processed in the normalizer 90 to sharpen its cyclic intensity variations before delivery via the line 92 to the gated counting circuit 100. Normalizer 90 preferably also includes circuit means for reducing or eliminating errors due to residual variations in the intensity of component beams 76 and 78, insuring that the count of intensity cycles of combined beam 84 corresponds accurately to intensity variations due to interference. For that purpose, the two component beams are sampled as they return to mirror 74 by the respective partially reflecting mirrors 86 and 88, and the samples are sensed by the respective photo-detectors Q2 and Q3. Mirrors 86 and 88 also reflect a portion of the outgoing radiation of beams 76 and 78 in the opposite direction. Such unwanted radiation from these and other mirrors of the system is absorbed by conventional radiation traps 89, which are provided wherever needed. The electrical analogue signals from Q2 and Q3, representing the respective component intensities $I_t$ and $I_r$ of equation (3) above, are supplied to normalizer 90 together with the signal from Q1 which represents the combined intensity I.

Normalizer 90 comprises electronic circuit means of conventional form for effectively subtracting $I_t$ and $I_r$ from I and dividing the result by a value approximating $2(I_t I_r)^{1/2}$. The resulting signal is an analogue representation of $\cos \phi$, as may be seen by solving equation (3) for $\cos \phi$ to give $$\cos \phi = (I - I_t - I_r)/2(I_t I_r)^{1/2} \qquad (13)$$

Since $\phi = 2\pi P/\lambda$ from equation (4), that signal comprises essentially a sinusoidal wave form having the period $P/\lambda$. That signal is then amplified and limited in conventional manner within normalizer 90 to produce on the output line 92 a distinct electrical pulse in response to each cycle of variation of the wave form. Those pulses are readily counted without ambiguity by the counter 100. Since the algebraic operations performed by normalizer 90 are corrective in nature and do not directly modify the result, even quite severe nonlinearity is acceptable, and it is therefore sufficient to provide relatively simple circuitry for carrying out the algebraic operations of equation (13).

Counter 100 is gated in response to gating signals received via the line 104 in such a way that only those intensity cycles are counted which occur within a predetermined frequency range of the radiation from source 60. Illustrative apparatus for producing suitable gating signals for control of counter 100 employs a reference radiation source for producing two sharply defined radiation frequencies $f_1$ and $f_2$ corresponding to the desired end frequencies of the effective frequency sweep of primary source 60. Such reference frequencies are typically provided by a conventional multiple frequency gas laser 110 together with suitable filters 111 for limiting the reference beam 112 to the desired pair of frequencies. It may sometimes be more convenient to derive the two end frequencies from separate sources, such as gas lasers which are frequency stabilized in conventional manner. The two beams can then be combined optically to form a unitary reference beam, or can remain as distinct beam components for any desired portion of the processing to be described. A portion of reference beam 112 is deflected at 115 by the partially reflecting mirror 114, and is directed by the mirror 116 into the previously described monochromator 63 in parallel with the primary beam 59 from tunable laser 61. Since the monochromator transmits at any moment only a single sharply defined frequency, while input beam 115 contains only the two end frequencies $f_1$ and $f_2$, the corresponding output intensity at 117 is normally essentially zero, but shows sharp intensity peaks as primary beam 62 sweeps through the selected end frequencies. Those peaks are directed by the mirror 118 to the photodetector Q4, which supplies electrical pulse signals to the gate generator 120.

As an illustrative alternative arrangement at monochromator 63, reference beam 115 may, if preferred, be directly combined with primary radiation beam 59 by a partially reflecting mirror at the monochromator input. A second partially reflecting mirror at the monochromator output then deflects a portion of the combined beam to Q4. With suitable adjustment of the relative intensities of the reference and primary radiation components, the narrow reference frequencies $f_1$ and $f_2$ stand out clearly from the primary radiation that reaches Q4, producing definite end pulses, whereas the reference radiation that enters interferometer 70 with primary beam 62, being confined to the two end frequencies, does not affect the output of counter 100. Also, a partially or wholly separate monochromator may be provided for beam 115, with suitable coupling to insure accurate synchronization with the frequency varying mechanism of primary radiation source 60, at least at the two selected end frequencies.

Gate generator 120 typically comprises a conventional frequency dividing circuit which supplies a gate enabling voltage to line 104 in response to the first input pulse from Q4, and terminates that voltage in response to the second input pulse. Thus counter 100 is enabled only during the time period during which the primary radiation in beam 62 sweeps between $f_1$ and $f_2$. That gating action is typically independent of the direction of the frequency sweep. Counter 100 typically includes conventional circuitry for generating digital signals representing the resulting count and supplying those signals to output lines 102.

The portion of reference beam 112 not deflected by mirror 114 is typically subjected to the filter 143, which is selected to transmit the desired one of the two reference frequencies $f_1$ and $f_2$ contained in the beam. The resulting monochromatic beam 142 enters the monitor interferometer indicated generally at 140, where it is split by the partially reflecting mirror 144 into the substantially equal target and reference beams 146 and 148. Those beams are returned by respective target and reference mirrors, which are typically the same mirrors 80 and 82 which form part of primary interferometer 70, as indicated. Interference occurs in the resulting combined beam 154, producing cyclic intensity variations in response to any change in the path difference between the two component beams 146 and 148, in the manner already described. Photodetector Q5 senses the intensity I of beam 154 and delivers a corresponding analogue signal to the normalizer 160.

Normalizer 160 processes the input signal from Q5 to sharpen the cyclic variations and produce on the line 162 a definite electrical pulse in response to each cycle of variation of intensity I. That processing may, if desired, include compensation for variation of the individual component intensities $I_t$ and $I_r$, as already described for normalizer 90. For that purpose, signals representing $I_t$ and $I_r$ may be supplied by the photodetectors Q6 and Q7, which sense radiation samples derived from the respective beams 146 and 148 by the partially reflecting mirrors 156 and 158, as shown in the figure. However, the refinement of such compensation can ordinarily be omitted in the monitor interferometer.

The output pulses from normalizer 160 on line 162 are counted by the conventional electronic counter 170, which typically delivers the resulting count to lines 172 in the form of a suitable digital code. Counter 170 is gated, typically by the same gating signal on line 104, already described, so that the count includes only those input pulses received during the frequency sweep of primary monochromator 70 between the selected end frequencies $f_1$ and $f_2$.

Under some conditions it may be preferred to obtain digital signals representing peak counts for both reference frequencies $f_1$ and $f_2$, rather than only for the frequency selected by filter 143. That can be accomplished by omitting that filter so that both frequencies are processed in parallel by interferometer 140. The dual output beam from the interferometer is then split by a partially reflecting mirror into two beams which are differentially filtered and separately sensed by respective photodetectors. A set of electrical signals is thus produced for each frequency, corresponding to the signals already described from Q5, Q6 and Q7. Those sets are separately processed and counted by respective normalizers and counters, making available the desired counts for both end frequencies of the sweep.

Although interferometers 70 and 140, as schematically represented in FIG. 6, utilize in common only the target and reference mirrors 80 and 82, it will be understood that additional optical elements may be shared between them. Also, the beams of the respective monochromators are preferably positioned closely adjacent or even coinciding with each other at the target and reference mirrors. Since the target mirror must be conveniently movable to make the path difference D conform to whatever distance is to be measured, it is usually preferred that at least the target mirror comprise a roof reflector or triple reflector of conventional type to facilitate maintaining optical alignment.

The system of FIG. 6 also includes means for determining the sense of any change that takes place in the path difference between the two radiation paths. As typically shown, radiation samples are derived by the respective partially reflecting mirrors 176 and 178 from the respective returning component beams 146 and 148 of monitor interferometer 140. Those samples are delivered to a partially reflecting mirror 174 to produce interference in the resulting combined beam 184, which is sensed by the photodetector Q8. However, one of the sample beams is delayed relative to the other by insertion of the quarter wave plate 180 ahead of mirror 174. The cyclic variations in the intensity I' of combined beam 184 are thereby shifted in phase relative to those in beam 154 of the main monitor interferometer, the shift being in one sense or the other according to the direction of change of path length. The signals from Q5 and Q8, representing I and I', are supplied to the comparison circuit 190, which is typically of conventional form, comparing the phase of the two input signals and producing on the line 192 a signal that has one value if target mirror 70 is approaching and another value if it is receding.

The various output signals that have been described may be utilized in any suitable manner to obtain the desired information. For example, each signal may be displayed visually by conventional apparatus, and the necessary computations performed manually. The simplest situation results when the signal on line 172 is zero, indicating zero peak count for monitor interferometer 140, and hence no movement of target mirror 80 during the measurement. The peak count for primary interferometer 70 is then obtained from the signal on line 102 and is simply multiplied by the value of K in equation (10A) to give a direct measure of the optical path difference P. The optical mirror separation D is then P/2.

If the signal on line 172 is not zero, giving a finite value for $N_m$ of equations (12) and (12A), one may determine which of those equations is applicable by comparing the direction signal on line 192 and the known direction of frequency sweep during the measurement. The signal on line 102, representing $N_s$, is then corrected by adding or subtracting $N_m$ according to the applicable equation. The resulting value for $N_f$ is multiplied by K.

It will ordinarily be convenient to perform those simple logical and mathematical operations by means of a computer 200, which may be constructed for this specific purpose or may comprise a general purpose computer suitably programmed in conventional manner. As indicated in the drawing, the signals on lines 102, 172 and 192 are supplied to computer 200, as well as the gate signal on line 104 which indicates when the two interferometer counts have been completed. The computed value of P or D is then typically supplied via the lines 201 to a suitable display device 202 which provides a visual display or printed record of the result of the measurement.

To facilitate adjusting target mirror 80 with respect to a distance to be measured, the mirror is typically mounted on a carriage 210 which is movable in translation along a track 212 parallel to radiation beam 78, as by screw mechanism not explicitly shown. For example, as indicated in FIG. 6, a gauge block 214 to be measured is positioned with one end in mechanical contact with a fixed reference surface 216 perpendicular to the track, and carriage 210 is similarly positioned relative to the other end of the block. A fringe count then establishes the optical mirror separation, that is, the optical distance from target mirror 80 to the optical image 82a of reference mirror 82 as reflected in mirror 74. Also, a reference fringe count is made with the carriage similarly positioned relative to reference surface 216. Substitution of the count difference for $n$ in equation (11) above then gives a direct measure of the gauge length.

Carriage 210 may be brought into desired relation to a surface such as 216 or any other physically or optically defined location by one of the many electronic or optical procedures which are well known in conventional interferometery. If the surface to be measured produces suitable specular reflection it can often be employed directly as the target mirror. Two complete interferometer systems may be arranged with their radiation beams 76 in parallel opposed relation. The two ends of a distance to be measured can then be located by simultaneous fringe counts made in the respective systems, the correct relationship between such counts being established in any suitable manner, as by measuring a known standard distance, for example.

It will be recognized by those skilled in the art that many different configurations can be devised to produce functions essentially equivalent to those which have been described, without departing from the essence of the present invention. For example, especially for applications requiring only a moderate range of frequencies between $f_1$ and $f_2$, laser 61 need not be tunable, but may comprise a laser of known type such as a dye laser capable of simultaneously emitting frequencies distributed continuously throughout the entire range that is required. Under that condition control 65 is typically coupled only to monochromator 63, which then selects from the continuous laser spectrum essentially a single wavelength that sweeps continuously through the required range.

As a further illustrative modification, monochromator 63 or its equivalent may be positioned quite flexibly in the radiation beam. In particular, as shown schematically in FIG. 8, it may be placed at 63a in combined beam 84 rather than in entrance beam 62. The supplementary beams from mirrors 86 and 88, if used, are then processed also by the same monochromator, or, as shown, by a coupled auxiliary monochromator 63b. In that arrangement all of the radiation frequencies emitted by laser 61 traverse interferometer 70, but only the narrow "line" transmitted by the monochromator is sensed by photodetector Q1. Although the other frequencies may actually produce interference in beam 84, they are eliminated at the monochromator and are not detected. Thus, the only "effective interference" is that of the single frequency selected at each instant by the monochromator.

An illustrative type of alternative apparatus for generating a gate signal for control of counters 100 and 170 is shown in fragmentary and schematic form in FIG. 7. The variable frequency radiation beam from source 60 is sampled by the partially reflecting mirror 220, and the sample is optically divided and supplied to the two frequency selecting devices 222 and 224. Those devices typically comprise selective optical filters of interference type in combination with Fabry-Perot etalons or the like, and are designed in known manner to pass only respective sharply defined spectral lines at the frequencies which have been selected as end frequencies $f_1$ and $f_2$. As source 60 sweeps through its frequency range including those end frequencies, devices 222 and 224 transmit respective sharp radiation pulses which are sensed by the respective photodetectors Q4a and Q4b. The resulting electrical pulses are supplied as inputs to a gate generator 120a, which functions in substantially the manner already described to develop on line 104 a gate voltage for supply to counters 100 and 170. The apparatus of FIG. 7 thus develops a gating signal without utilizing the reference frequencies from laser 110 of FIG. 6, which may be delivered directly to monitor interferometer 140.

The gate generating apparatus of FIG. 7 may be viewed as an alternative to the described action of beam 115 in FIG. 6. It is particularly advantageous, however, in systems having no monochromator corresponding to 63 of FIG. 6. For example, tunable laser 61 may not require any monochromator to produce a substantially monochromatic and coherent beam, or the monochromator may be incorporated in the resonant cavity of the laser in such a way that it is not accessible to receive reference beam 115 of FIG. 6.

The gate generator of FIG. 7 is also particularly useful in systems designed for measuring only stationary targets. Such systems do not require a monitor interferometer for compensating target movement. Availability of the alternative gate generator then permits omission of reference frequency source 110 as well as of the monitor interferometer and its associated electronic apparatus.

When a variable frequency interferometer is intended to provide maximum accuracy of measurement, the radiation source should ordinarily provide the largest feasible difference between the end frequencies $f_1$ and $f_2$. For one thing, the larger the bandwidth $f_2 - f_1$ the less the relative error in its determination due to any error in each of the end frequencies. Also, the maximum uncertainty in the peak count $n$ is typically one count, as explained above in connection with equation (11). The corresponding uncertainty in the measured mirror separation D can be seen to be inversely proportional to the bandwidth by setting $n$ equal to unity in equation (11A). Thus, a variable frequency interferometer employing as source a dye laser such as that supplied currently by Molectron Corporation of Sunnyvale, California, for example, which incorporates a diffraction grating and is tunable over a wavelength range from 340 to 740 nm, can typically measure distances with a resolution better than one micron.

The above discussion has assumed for clarity that only integral numbers of intensity peaks are counted. However, in actual practice conventional means for phase interpolation can readily be provided in counter 100, the resulting fractional counts being carried through the subsequent computations. Such obvious refinements in technique can reduce the uncertainty in peak count, but without altering the basic relationships discussed above.

The range of distances that a variable frequency interferometer can measure directly is limited in practice primarily by the spectral resolution of the radiation producing the interference. Adequate coherence can usually be assumed if the radiation is derived from lasers. In FIG. 6, for example, the radiation leaving monochromator 63 is not strictly monochromatic, but comprises a narrow band distributed about a center frequency. If two such distributions are superposed, their combined intensity distribution shows two distinct peaks only if the center frequencies have a minimum separation, which provides a useful measure of the resolution produced by the monochromator. Similarly, detector Q1 can distinguish adjacent intensity peaks of the interference pattern only if they correspond to frequencies whose spacing at least corresponds to the resolution of the monochromator. Since each count thus requires a minimum frequency interval, the spectral resolution sets a limit upon the ratio of the total counts $n$ divided by the frequency bandwidth $f_2 - f_1$. But that ratio is directly proportional to the mirror separation D, as shown by equation (11A). Therefore, the maximum value of D that can be measured is limited by the spectral resolution, and cannot be increased, for example, by increasing the bandwidth through which the frequency is swept. The maximum distance $D_m$ in cm that can be measured directly is approximately given by $1/(2R)$, where R is the spectral resolution in wave numbers, that is, waves per cm. Thus, for example, the commercially available tunable dye laser mentioned above, when equipped with tunable etalons both within and external to the resonant cavity, gives a resolution of 0.001 nm, corresponding approximately to a range of measurement of 13 cm. A further etalon stage would correspondingly extend that range.

Further information on the design and construction of dye lasers is to be found, for example, in U.S. Pat. No. 3,740,665 and in the patents and other literature cited therein. Such lasers can be pumped continuously and tuned in conventional manner by use of prisms, etalons or gratings, or combinations of such devices. Illustrative examples of known tuning techniques are described in U.S. Pat. Nos. 3,443,243, 3,774,121 and 3,775,699, for example.

We claim:

1. In combination with interferometric apparatus for dividing substantially coherent radiation between a reference component beam including a reference mirror and a target component beam including an adjustably movable target mirror, and for recombining the component beams to produce interference; means for measuring a selected position of the target mirror relative to a reference position corresponding to the virtual image of the reference mirror, comprising
   means for causing the effective frequency of the interfering beams to vary monotonically over a predetermined frequency interval to produce a plurality of intensity cycles in the combined beam,
   means for producing essentially monochromatic reference beams of the respective two end frequencies of said frequency interval,
   means acting in response to radiation of said monotonically varying frequency and radiation of the respective reference beams for detecting frequency coincidence thereof and for generating respective gating signals,
   and counting means acting under control of the gating signals for counting the number of intensity cycles during said frequency variation as a measure of said selected mirror position.

2. Apparatus according to claim 1 wherein said position to be measured is subject to variation during said frequency variation, said measuring means further comprising:
   means for determining the number of intensity cycles due to said position variation.

3. Apparatus according to claim 2 including means for indicating the direction of said position variation.

4. Apparatus according to claim 1 wherein said frequency varying means include variable monochromator means for passing selectively substantially monochromatic radiation having said varying frequency and positioned to receive said beams of varying effective frequency after said combination of those beams to produce interference.

5. Apparatus according to claim 1 wherein said frequency varying means include variable monochromator means for passing selectively substantially monochromatic radiation having said varying frequency, said coincidence detecting means comprising
   means for supplying radiation of said reference beams to said monochromator means, and
   means responsive to intensity variations in the radiation passed by said monochromator means.

6. Apparatus according to claim 5 wherein said monochromator means are positioned to receive said beams of varying effective frequency after said combination of those beams to produce interference.

7. Apparatus according to claim 1 wherein said means for producing reference beams comprise monochromator means for passing selectively the respective end frequencies of said frequency interval, said coincidence responsive means comprising
   means for supplying radiation of said varying frequency to said monochromator means, and
   means responsive to intensity variations in the radiation passed by said monochromator means.

8. Interferometric mensuration apparatus including means for producing interference by combination of substantially coherent component radiation beams of optical frequency and means for maintaining a definite relationship between a distance to be measured and the optical path difference of the component beams, said apparatus being further characterized by
   means for monotonically varying the effective frequency of the interfering component beams through a definite frequency interval to produce a plurality of intensity cycles in the combined beams, said distance to be measured being subject to variation during said frequency variation,
   and means for determining the number of intensity cycles due to such frequency variation, which means comprise
   means responsive to the combined beam intensity of variable frequency for counting the intensity cycles due jointly to said frequency variation and said distance variation, means for producing interference by combination of substantially coherent component radiation beams of a fixed frequency, and for maintaining a constant differential relationship between the optical path difference of said fixed frequency beams and the optical path difference of said variable frequency beams, and means for counting the intensity cycles of the fixed frequency combined beams during said frequency variation to determine the number of said intensity cycles of the variable frequency beams due to said distance variation.

9. Apparatus according to claim 8 including means for indicating the direction of said distance variation comprising means for producing interference by combination of component radiation beams derived from said fixed frequency component radiation beams with insertion of a fractional wavelength phase difference therebetween, and means responsive jointly to the resulting combined beams and said fixed frequency combined beams.

10. Apparatus according to claim 9 wherein said fixed frequency is the frequency at an end of said frequency interval.

11. Apparatus according to claim 8 wherein said fixed frequency is the frequency at an end of said frequency interval.

12. Apparatus according to claim 8 including means for detecting equality of said varying frequency and the respective end frequencies of said frequency interval, both said counting means being gated under control of said detecting means.

13. Apparatus according to claim 8 wherein said frequency varying means include variable monochromator means for passing selectively substantially monochromatic radiation having said varying frequency, said apparatus including means for producing reference radiation of the two frequencies at the respective ends of said frequency interval, means for supplying said reference radiation to said monochromator means, means responsive to variations in the radiation passed by said monochromator means for detecting equality of said varying frequency and the respective reference frequencies, and means for gating each of said counting means under control of said detecting means.

14. Apparatus according to claim 13 including means for supplying selectively either of said reference frequencies to said fixed frequency interference producing means.

15. Method of measuring a distance by interferometry, comprising maintaining a definite relationship between the distance to be measured and the optical path difference between the component radiation beams of an interferometer, which beams produce optical interference when combined, varying the frequency of the interfering radiation beams monotonically between first and second predetermined reference frequencies to produce a plurality of cyclic variations in the intensity of the combined beams, producing reference radiation beams of the respective said reference frequencies, developing control signals in response to equality of said varying frequency and the respective reference frequencies, counting the intensity cycles during said frequency variation, starting and terminating said cycle count in response to the respective control signals, and deriving a measure of said distance from the cycle count and the values of said reference frequencies.

16. Method of determining the difference between the optical path lengths of the component radiation beams of an interferometer, which beams produce optical interference when combined, said path difference being subject to variation during said determination, comprising varying the frequency of the interfering radiation beams monotonically between first and second reference frequencies to produce a plurality of cyclic variations in the intensity of the combined beams, counting the intensity cycles during said frequency variation, producing interference by combination of substantially coherent auxiliary component radiation beams of one of said reference frequencies with an optical path difference having a constant differential relationship to said interferometer path difference, counting the intensity cycles of the combined auxiliary beams during said frequency variation of the first said beams, and determining said interferometer path difference in terms of the first said cycle count, corrected by summation with the auxiliary cycle count, and the values of said reference frequencies.

17. Method according to claim 16, including determining the sense of variation of the first said path difference, comparing the sense of path difference variation with the sense of said frequency variation, and summing said cycle counts with opposite or equal signs according as the senses of said variations are the same or opposite, respectively.

18. Method according to claim 16, including producing reference radiation beams of the respective said reference frequencies, developing control signals in response to equality of said varying frequency and the respective reference frequencies, and starting and terminating both said cycle counts in response to the respective control signals.

* * * * *